United States Patent [19]
Rapaport

[11] Patent Number: 6,106,884
[45] Date of Patent: *Aug. 22, 2000

[54] POUR AND BAKE CHEESECAKE

[75] Inventor: Lauren Elyse Rapaport, Lake Zurich, Ill.

[73] Assignee: Kraft Foods, Inc., Northfield, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/928,840

[22] Filed: Sep. 12, 1997

[51] Int. Cl.[7] .................................................. A23C 19/00
[52] U.S. Cl. ........................... 426/582; 426/580; 426/586
[58] Field of Search ..................... 426/582, 580, 426/558, 586, 654, 658, 524

[56] References Cited

U.S. PATENT DOCUMENTS

| | | | |
|---|---|---|---|
| 2,112,442 | 3/1938 | Libanoff | 99/92 |
| 3,455,698 | 7/1969 | Vakaleris | 99/94 |
| 3,666,493 | 5/1972 | Bluemke | 99/139 |
| 4,163,806 | 8/1979 | Callen et al. | 426/582 |
| 4,312,891 | 1/1982 | Eisfeldt | 426/582 |
| 4,425,369 | 1/1984 | Sakamoto et al. | 426/582 |
| 4,427,709 | 1/1984 | Guhl et al. | 426/555 |
| 4,504,512 | 3/1985 | Danielson et al. | 426/579 |
| 4,594,255 | 6/1986 | Wilson et al. | 426/578 |
| 4,732,772 | 3/1988 | Nolte | 426/578 |
| 4,795,650 | 1/1989 | Groobert | 426/306 |
| 5,250,316 | 10/1993 | Harris | 426/582 |

OTHER PUBLICATIONS

Dialog (R) File 707: The Seattle Times, 08622146, Sep. 1, 1996, Cece Sullivan.

Philadelphia Brand Cream Cheese Kraft Cookbook, 1988, p. 148–195, Beekman House, New York.

*Primary Examiner*—Leslie Wong
*Attorney, Agent, or Firm*—Fitch, Even, Tabin & Flannery

[57] ABSTRACT

A ready-to-bake cheesecake batter, which can be stored for extended periods of time at refrigerated temperatures, will produce a premium quality cheesecake when baked. A method of preparing the cheesecake batter also is provided. The cheesecake batter is prepared from Neufchatel cheese soft body cream cheese, water, cream, sugar, corn syrup, emulsifier and stabilizer. The ingredients are mixed, heated, homogenized and then refrigerated until ready for use.

8 Claims, No Drawings

POUR AND BAKE CHEESECAKE

FIELD OF THE INVENTION

The present invention is directed to a pour-and-bake dessert product and its method of manufacture. More particularly, the present invention relates to an egg-free cheesecake batter, which can be stored for extended periods of time at refrigerated temperatures and then may be directly poured and baked to produce a high-quality cheesecake dessert.

BACKGROUND OF THE INVENTION

Making a cheesecake from scratch using ingredients including a soft uncured cheese (such as cream cheese), butter, eggs, and sugar provides a quality dessert having premium flavor and texture. Preparing such a cheesecake, however, requires significant time and effort that many consumers today are unwilling or unable to expend. Various ready-to-use-type cheesecake products are known which are intended to allow the consumer to prepare a cheesecake in less time and with less effort. These products, however, sacrifice a certain degree of quality to convenience. To compensate for the decline in quality, it may be necessary for the, consumer to add staple ingredients, such as cream cheese, in order to provide a cheesecake of a quality more closely resembling a from-scratch cheesecake.

Dry mixes may also offer certain time-saving advantages. Often, the mixes are made so that the consumer only adds water to the mix and bakes. These mixes can be stored at ambient temperature for extended periods of time. These mixes alone do not provide the quality of fresh ingredients. In some cases, the consumer may be required to add certain ingredients to improve the quality; however, having the consumer to add ingredients detracts from the time-saving advantages of using a prepared mix, as well as increases the effort required by the consumer.

Cheesecake mixes are known that can be used to prepare a cold-set cheesecake, thereby eliminating baking. U.S. Pat. No. 4,312,891, issued to Eisfeldt, discloses a shelf-stable fluid product that gels upon setting at refrigerated temperatures. The product contains gelatin, starch, sweetening agent, and a protein source, which are believed to interact during preparation of the product to provide a reversible gel matrix. The consumer whips the product to incorporate air into the product and then refrigerates the product, allowing it to gel and form a cheesecake.

U.S. Pat. No. 4,594,255, issued to Wilson, discloses a dry mix which can be used to prepare a sugar-free cheesecake. Milk is added to the mix, and the rehydrated mix then is whipped to mix the ingredients, as well as to incorporate air into the filling, which will affect the lightness of the texture of the final product. The mix then is poured into a prepared crust and chilled for several hours to allow the mix to gel and form a cheesecake.

These cold-set mixes also sacrifice a degree of quality because of the constitution of the ingredients and the method of preparation. Cold-set cheesecakes generally cannot offer the texture and mouthfeel of a baked-from-scratch cheesecake because of the addition of a gel component in the mix. Furthermore, although the cold-set method may be easier than baking, the benefits to texture and appearance from baking are lost.

Cheesecake products are known which can be used to prepare an improved-quality cheesecake when the consumer bakes the dessert rather than having it gel in the refrigerator. These products still save time because a complete (or nearly complete) mix is provided. One such ready-to-bake mix is disclosed in U.S. Pat. No. 4,732,772 to Nolte which discloses a ready-to-use cheesecake filling mix which, upon whipping and baking, produces a quality cheesecake filling. The filling mix contains, among other ingredients, cream, sugar, eggs, milk, and nonfat dry milk. Such a mix is storable for an extended period of time at refrigerator or freezer temperatures. The consumer aerates the filling mix by whipping and then bakes. Preparing a cheesecake from a mix of this type still requires effort and time on the part of the consumer. Moreover, failure to fully aerate the filling mix can result in a less desirable product.

Inasmuch as conventional ready-to-use mixes, such as that disclosed in U.S. Pat. No. 4,732,772, contains eggs, certain problems associated with the handling of raw eggs may arise during production due to potential microbiological growth, activity, or contamination. Additionally, a potential risk from salmonella and other microbes exists for consumers and their children who may ingest raw (or less than fully cooked) batter at home. No known cheesecake product provides an egg-free, ready-to-use batter that can be baked to produce a quality cheesecake resembling a from-scratch cheesecake.

Furthermore, a from-scratch cheesecake prepared using traditional ingredients typically contains a relatively high level of fat. In recent years, attempts by consumers to reduce the fat in their diet have made it more likely that a consumer will choose a more nutritional dessert rather than cheesecake, or even will choose not to have any dessert at all. It is therefore also desirable to provide a ready-to-use batter that can be used to prepare a reduced-fat cheesecake.

SUMMARY OF THE INVENTION

Generally, in accordance with the present invention, an egg-free ready-to-bake cheesecake batter is provided. A method of making the cheesecake batter also is provided. The batter provides the quality and flavor of from-scratch cheesecake in a convenient, ready-to-use product. Additionally, because no eggs are contained in the batter, the traditional health risks associated with eggs are eliminated from the manufacture of the product and from consumer use. Preferably the cheesecake of the present invention contains less than about 3 g fat, and preferably less than about 1 g fat, per serving (generally about 4 oz. per slice or serving). By using relatively higher levels of Neufchatel cheese as to compare to the soft body cream cheese (i.e., approaching a 4:1 weight ratio of Neufchatel cheese to soft body cream cheese), a reduced-fat cheesecake batter can be prepared. In order to compensate for the increased levels of Neufchatel cheese, additional liquid (such, for example, as skim milk) can be added to avoid excessive "dryness" in the resulting baked cheesecake.

The batter can be stored at refrigerated temperatures until used, at which time the consumer simply pours the batter into a prepared crust and bakes in the oven. Adding ingredients, mixing, and/or whipping are not required. The batter can be made in a variety of flavors and in a low-fat version.

For purposes of this invention, "egg-free" is intended to mean an essentially egg-free batter having less than about 0.5 weight percent egg product and preferably less than about 0.1 weight percent egg product as well as a completely egg-free batter. Most preferably the essentially egg-free batter of the present is completely free of egg products.

By "baked-from-scratch cheesecake" it is meant a cheesecake prepared in a conventional manner of combining fresh ingredients such as eggs, cream, and sugar, whipping the ingredients together to mix and aerate the batter, pouring the batter into a crust, and baking in an oven.

By "high or premium quality cheesecake" it is meant a cheesecake having similar taste, aroma, appearance, and mouthfeel of a baked-from-scratch cheesecake.

One object of the invention is to provide a ready-to-bake cheesecake batter, which is egg-free and which requires only that the consumer pour the batter into a crust and bake to prepare a premium quality cheesecake.

It is another object of the invention to provide a ready-to-bake cheesecake batter that can be stored in the refrigerator for an extended period of time without product degradation.

It is a further object of the invention to provide a reduced-fat, ready. to-bake cheesecake batter.

It is a still further object of the invention to provide a method for manufacturing such a cheesecake batter.

Other objects and advantages will be apparent to those skilled in the art upon consideration of the invention described in this specification.

DETAILED DESCRIPTION OF THE INVENTION

The present invention relates to a ready-to-bake cheesecake batter and a method for producing such a batter. The batter contains fresh, high quality ingredients, such as cream cheese and cream, and can be stored for an extended period in the refrigerator. Preferably, no additional ingredients need be added to the batter in order to prepare a cheesecake. Using this batter, a consumer can bake a cheesecake which has the quality and flavor of a baked-from-scratch cheesecake in an easy, time-saving manner. Numerous flavor varieties, as well as a low-fat version, of the cheesecake are possible.

The cheesecake batter of the present invention generally contains water, Neufchatel cheese, soft body cream cheese, cream, emulsifier, corn syrup, sweeteners, flavoring, and stabilizers. Generally the Neufchatel cheese and soft body cream cheese are present in about 4:1 to about 1:2 weight ratio, preferably about 2.5:1 to about 1:1.5 weight ratio, and most preferably about a 2:1 weight ratio. These ratios generally provide an acceptable and desirable balance of texture, creaminess, and fluidity. Too much Neufchatel cheese can result in a dry crumbly cake; too much soft body cream cheese can result in an undesirable "bubbly" cake. With the use of relatively high level of Neufchatel cheese (i.e., weight ratios approaching about 4:1 of Neufchatel cheese to soft body cream cheese), additional liquid (e.g., skim milk or the like) can be added, if desired, to avoid "dryness." The following table indicates the primary function of each of these primary ingredients and the preferred amounts added to the batter.

TABLE

| Ingredients | Primary Function | Weight Percent |
| --- | --- | --- |
| Water | Viscosity | 9–12% |
| Neufchatel Cheese | Texture | 35–48% |
| Soft Body Cream Cheese | Flavor | 12–17% |
| Cream | Texture | 14–17% |
| Emulsifier | Texture | 0.2–0.3% |
| Granulated Sugar | Flavor | 10–13% |
| High Fructose Corn Syrup | Texture | 3–5% |
| Calcium Propionate | Stability | 0.05–0.07% |

TABLE-continued

| Ingredients | Primary Function | Weight Percent |
| --- | --- | --- |
| Potassium Sorbate | Stability | 0.05–0.07% |
| Vanilla | Flavor | 0.25–0.5% |

Using Neufchatel cheese (a brick type cream cheese), a soft body cream cheese, and cream in the batter provides a premium quality cheesecake. These ingredients provide the quality of a made-from-scratch cheesecake made with Philadelphia Brand Cream Cheese but in a ready-to-use batter, so that the consumer need not purchase the cream cheese separately. Generally, the cheeses and cream provide the desired flavors, texture, and viscosity. High fructose corn syrup can be, and preferably is, added to the batter to prevent heavy skinning on the surface of the finished product and also to provide extra moisture to batter. The high fructose corn syrup and sugar also provide desirable flavor components. Stabilizers such as calcium propionate and potassium sorbate and appropriate emulsifiers can also be included. If desired, low-calorie sugar substitutes can be used to replace some or all of the sugar.

Because the batter does not contain eggs, health risks in the plant during manufacture, as well as to the consumer at home, are minimized. Thus, manufacturers should find meeting and implementing Hazard Analysis and Critical Control Points (HACCP) standards, conditions, and/or plans easier. In addition, a possible health hazard from salmonella (or other microbes) for consumers who ingest the uncooked batter is significantly reduced. Moreover, consumers who may be allergic to egg products may be able to enjoy the present cheesecake product.

The consumer does not need to mix, add additional ingredients to, or otherwise prepare the batter before baking. Whipping in order to aerate the batter, however, sometimes may be desirable, although not required. Thus, whipping may produce an especially light and airy texture that some consumers may find desirable. Such whipping can be carried out, for example, using a wisp or a conventional home kitchen-type mixer. Additionally, the consumer may choose to add other ingredients to customize the flavor of the cheesecake. Such additional ingredients only enhance the flavoring already provided in the batter; they are not required in order to prepare a quality cheesecake from the batter of the invention. Of course, if desired, such flavor components could be added to the batter during manufacture.

In general, the consumer only has to open the container in which the batter is stored, pour or otherwise place the batter into a prepared crust, and then bake. The batter is readily pourable (i.e., viscosity of about 250 to 550 poises, preferably about 400 poises, at about 40° F.) from the container and is easily spreadable in the crust. Generally the batter is a light yellow to cream color although, if desired, other colorants can be included. When baked, the cheesecake of this invention is similar to a baked-from-scratch cheesecake. It has a light yellow interior with a lightly browned surface with a distinct cream cheese flavor, slightly sweetened, and a smooth mouthfeel. Using only a conventional home kitchen-type mixer, the resulting cheesecake is fluffy with a specific gravity of about 0.9.

The batter is normally stored at refrigerated temperatures. An acceptable storage temperature is in the range of about 35° F. to about 45° F. and more preferably between about 37° F. and 40° F. When stored at these temperatures, the batter generally has a four to six month shelf life. During storage at refrigeration temperatures, the batter will thicken slightly by about the second month with little change thereafter. This thickening does not appear to effect the functionality or quality of the product.

In a preferred method of the invention, a mixture of Neufchatel cheese and soft body cream cheese first is provided in about 4:1 to about 1:2 weight ratio, preferably about 2.5:1 to about 1:1.5 weight ratio, and most preferably about a 2:1 weight ratio. This mixture is placed in a mixer, such as a Breddo, and mixed (generally at a rate of about 1500 to about 2,500 rpm). Dry and liquid ingredients, including cream, granulated sugar, water, corn syrup, emulsifier, and stabilizer, are then added to the mixer in the amounts indicated in the Table and blended until a homogenous mixture is obtained. Suitable stabilizers include calcium propionate, potassium sorbate, sorbic acid, phosphoric acid, and the like. Suitable emulsifiers include mono and diglycerides. An especially preferred emulsifier is Durem 114 manufactured by Quest International.

After the above ingredients are added to the mixer, recirculation is started. Once a homogenous mixture is obtained (generally in about 3 to 5 minutes), the mixture is heated to a temperature effective for pasteurization (generally about 170 to about 180° F., preferably about 175° F.). Flavoring and food-grade acids are then added. Suitable flavorings include, for example, vanilla, chocolate, lemon, and the like. Preferred acids include lactic acid, citric acid, sorbic acid, phosphoric acid, and the like. The pH of the mixture is adjusted to below about 5, and preferably to about 4.2 to about 4.6

The mixture is homogenized, preferably without significant cooling from the pasteurization temperature, using conventional methods. Homogenization is generally carried out at about 1000 to about 2500 psi, preferably at about 1,500 psi, and at a temperature of about 155° to about 165° F. Once a homogenous mixture is obtained, the batter can be dispensed into product containers, preferably by hot packing at a temperature of about 155° to about 165° F., and then cooled to normal refrigerated temperatures.

What is claimed is:

1. An egg-free ready-to-use cheesecake batter that is stable at refrigerated temperatures, the batter consisting essentially of:
    (a) water in the range of from about 9 to about 12 weight percent;
    (b) Neufchatel cheese in the range of from about 35 to about 48 weight percent;
    (c) soft body cream cheese in the range of from about 12 to about 17 weight percent;
    (d) cream in the range of from about 14 to about 17 weight percent;
    (e) an emulsifier in the range of from about 0.2 to about 0.3 weight percent;
    (f) a sweetener in the range of from about 10 to about 13 weight percent;
    (g) corn syrup in the range of from about 3 to about 5 weight percent; and
    (h) a stabilizer in the range of from about 0.1 to about 0.15 weight percent;
    wherein the cheesecake batter is egg-free, stable for about 4 to about 6 months at a temperature of about 35° to about 45° F., and ready to bake.

2. A cheesecake batter in accordance with claim 1, wherein the cheesecake batter is pourable at about 40° F.

3. A cheesecake batter in accordance with claim 2, wherein the viscosity of the cheesecake batter is about 250 to about 550 posies at about 40° F.

4. A cheesecake batter in accordance with claim 1, wherein the cheesecake batter contains less than about 3 grams of fat per 4 oz. Serving size.

5. A cheesecake batter in accordance with claim 1, wherein the batter also contains a flavoring selected from the group consisting of vanilla, chocolate, chocolate chip, and lemon.

6. An egg-free, ready-to-use, cheesecake batter that is stable for about 4 to about 6 months at a temperature of about 35° to about 45° F., wherein the batter is pourable at about 40° F. and the batter comprising water in the range of from about 9 to about 12 weight percent; Neufchatel cheese in the range of from about 35 to about 48 weight percent; soft cream cheese in the range of from about 12 to about 17 weight percent; emulsifier in the range of about 0.2 to about 0.3 weight percent; cream, sugar, corn syrup, one or more stabilizers, and a flavoring.

7. A cheesecake batter in accordance with claim 6, wherein the viscosity of the cheesecake batter is about 250 to about 550 poises at about 40° F.

8. A cheesecake batter in accordance with claim 7, wherein the flavoring is selected from the group consisting of vanilla, chocolate, chocolate chip, and lemon.

* * * * *